(12) United States Patent
Walz

(10) Patent No.: US 11,727,425 B2
(45) Date of Patent: Aug. 15, 2023

(54) COLLECTING AND ANALYZING DATA FROM A MOBILE DEVICE

(71) Applicant: BREAD FINANCIAL PAYMENTS, INC., Columbus, OH (US)

(72) Inventor: James Walz, Blacklick, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 0 days.

(21) Appl. No.: 16/195,748

(22) Filed: Nov. 19, 2018

(65) Prior Publication Data

US 2019/0164184 A1 May 30, 2019

Related U.S. Application Data

(62) Division of application No. 14/584,771, filed on Dec. 29, 2014, now Pat. No. 10,157,397.

(51) Int. Cl.
*G06Q 30/02* (2023.01)
*G06Q 30/0207* (2023.01)
(Continued)

(52) U.S. Cl.
CPC ..... *G06Q 30/0207* (2013.01); *G06Q 20/3274* (2013.01); *G06Q 30/06* (2013.01);
(Continued)

(58) Field of Classification Search
CPC .............. G06Q 30/0207; G06Q 30/06; G06Q 20/3274; H04N 1/32144; H04N 2201/3233; G11B 20/00884
See application file for complete search history.

(56) References Cited

U.S. PATENT DOCUMENTS

| | | | |
|---|---|---|---|
| 5,991,413 | A | 11/1999 | Arditti et al. |
| 6,144,848 | A | 11/2000 | Walsh et al. |

(Continued)

FOREIGN PATENT DOCUMENTS

| | | |
|---|---|---|
| CA | 2915375 A1 | 6/2016 |
| WO | 2015026863 A1 | 2/2015 |

OTHER PUBLICATIONS

G. Gray et al. Virtual Credit Card Processing System. ITB Journal, Issue 6, pp. 4-13. (Year: 2002).*

(Continued)

*Primary Examiner* — Waseem Ashraf
*Assistant Examiner* — Christopher C Busch

(57) ABSTRACT

An application platform configurable for collecting user data associated with a plurality of retail-branded credit cards is provided. The application platform includes a configurable front end comprising a graphical user Interface layer that is configurable to a specific one of the plurality of retail-branded credit cards, a backend layer comprising credit card functionality for directly performing credit card transactions associated with a specific one of the plurality of retail-branded credit cards, a data collection layer comprising a data collector for collecting user data associated with the plurality of retail-branded credit cards and an analytics engine coupled with the data collection layer for determining one or more attribute about a user from the user data associated with the plurality of retail-branded credit cards.

17 Claims, 10 Drawing Sheets

(51) Int. Cl.
*H04N 1/32* (2006.01)
*G11B 20/00* (2006.01)
*G06Q 20/32* (2012.01)
*G06Q 30/06* (2023.01)

(52) U.S. Cl.
CPC ... *G11B 20/00884* (2013.01); *H04N 1/32144* (2013.01); *H04N 2201/3233* (2013.01)

(56) References Cited

U.S. PATENT DOCUMENTS

| | | |
|---|---|---|
| 6,542,872 B1 | 4/2003 | Skubic et al. |
| 6,636,833 B1 | 10/2003 | Flitcroft et al. |
| 7,054,842 B2 | 5/2006 | James et al. |
| 8,249,893 B1 | 8/2012 | Allen |
| 8,255,323 B1 | 8/2012 | Casey et al. |
| 8,352,370 B1 | 1/2013 | White et al. |
| 8,412,593 B1 | 4/2013 | Song et al. |
| 8,510,163 B2 | 8/2013 | Hess et al. |
| 8,676,707 B2 | 3/2014 | Flitcroft et al. |
| 8,738,024 B1 | 5/2014 | Kerr et al. |
| 8,892,474 B1 | 11/2014 | Inskeep et al. |
| 9,317,849 B2 | 4/2016 | Pitroda et al. |
| 9,489,693 B2 | 11/2016 | Vargas et al. |
| 9,558,520 B2* | 1/2017 | Peak .................. G16H 10/65 |
| 9,741,028 B2* | 8/2017 | Webb .................. G06Q 20/20 |
| 9,741,045 B1 | 8/2017 | Henderson et al. |
| 9,881,928 B2 | 1/2018 | Denorme et al. |
| 10,026,076 B2 | 7/2018 | Kumar et al. |
| 10,068,287 B2 | 9/2018 | Nelsen et al. |
| 10,157,397 B2 | 12/2018 | Walz |
| 2002/0032649 A1 | 3/2002 | Selvarajan |
| 2002/0099607 A1 | 7/2002 | Sosa et al. |
| 2003/0018579 A1 | 1/2003 | Litster et al. |
| 2005/0251446 A1 | 11/2005 | Jiang et al. |
| 2006/0169785 A1 | 8/2006 | Jones |
| 2006/0181411 A1 | 8/2006 | Fast et al. |
| 2007/0022008 A1 | 1/2007 | Kingsborough et al. |
| 2008/0010193 A1 | 1/2008 | Rackley, III et al. |
| 2008/0306749 A1 | 12/2008 | Fredlund et al. |
| 2009/0006254 A1 | 1/2009 | Mumm et al. |
| 2009/0037333 A1 | 2/2009 | Flitcroft et al. |
| 2009/0048970 A1 | 2/2009 | Muscato |
| 2009/0159689 A1 | 6/2009 | Mullen et al. |
| 2009/0192928 A1 | 7/2009 | Abifaker |
| 2009/0307232 A1 | 12/2009 | Hall |
| 2010/0089998 A1 | 4/2010 | Sandstrom et al. |
| 2010/0114707 A1* | 5/2010 | Athsani ................. G06Q 30/02 705/14.58 |
| 2010/0185505 A1 | 7/2010 | Sprogoe et al. |
| 2010/0216542 A1 | 8/2010 | Van |
| 2011/0137804 A1* | 6/2011 | Peterson ............ G06Q 20/3224 705/77 |
| 2011/0153437 A1 | 6/2011 | Archer et al. |
| 2011/0282784 A1 | 11/2011 | Nelsen |
| 2011/0302084 A1 | 12/2011 | Melik-Aslanian et al. |
| 2012/0089507 A1 | 4/2012 | Zhang et al. |
| 2012/0101881 A1 | 4/2012 | Taylor et al. |
| 2012/0158934 A1 | 6/2012 | Xiao et al. |
| 2012/0253989 A1 | 10/2012 | Otruba et al. |
| 2012/0254020 A1 | 10/2012 | Debow |
| 2012/0266059 A1 | 10/2012 | Abela et al. |
| 2012/0271692 A1 | 10/2012 | Huang et al. |
| 2013/0030915 A1 | 1/2013 | Statler et al. |
| 2013/0060686 A1 | 3/2013 | Mersky |
| 2013/0103560 A1 | 4/2013 | Stone et al. |
| 2013/0103581 A1 | 4/2013 | Barry et al. |
| 2013/0254115 A1 | 9/2013 | Pasa et al. |
| 2013/0346305 A1 | 12/2013 | Mendes et al. |
| 2014/0040120 A1 | 2/2014 | Cho et al. |
| 2014/0058870 A1 | 2/2014 | Zhao |
| 2014/0067514 A1 | 3/2014 | Vitti et al. |
| 2014/0136355 A1* | 5/2014 | Park ..................... G06Q 20/322 705/21 |
| 2014/0149198 A1 | 5/2014 | Kim et al. |
| 2014/0172477 A1 | 6/2014 | Goulart et al. |
| 2014/0172687 A1 | 6/2014 | Chirehdast |
| 2014/0188704 A1 | 7/2014 | Grossman et al. |
| 2014/0201331 A1 | 7/2014 | Kershaw et al. |
| 2014/0279469 A1 | 9/2014 | Mendes |
| 2014/0289809 A1 | 9/2014 | Taylor et al. |
| 2014/0365334 A1 | 12/2014 | Hurewitz |
| 2015/0058134 A1* | 2/2015 | Hwang ............. G06Q 20/3555 705/14.66 |
| 2015/0120343 A1 | 4/2015 | Burger-Lenehan et al. |
| 2015/0120561 A1 | 4/2015 | Ver Hulst et al. |
| 2015/0140982 A1 | 5/2015 | Postrel |
| 2015/0186872 A1 | 7/2015 | Sobol et al. |
| 2015/0199604 A1 | 7/2015 | Nack et al. |
| 2015/0227922 A1 | 8/2015 | Filler |
| 2015/0235230 A1 | 8/2015 | Ainsworth, III et al. |
| 2015/0242839 A1 | 8/2015 | Sanchez et al. |
| 2015/0248665 A1 | 9/2015 | Walz |
| 2015/0262248 A1 | 9/2015 | Chaouki et al. |
| 2015/0262291 A1 | 9/2015 | West et al. |
| 2015/0310402 A1 | 10/2015 | Balusamy |
| 2016/0012375 A1 | 1/2016 | Hanson et al. |
| 2016/0071133 A1 | 3/2016 | Gupta et al. |
| 2016/0110694 A1 | 4/2016 | Walz et al. |
| 2016/0110707 A1 | 4/2016 | Nack et al. |
| 2016/0117867 A1* | 4/2016 | Yuan ................. G06Q 20/3278 705/13 |
| 2016/0189152 A1 | 6/2016 | Walz |
| 2016/0189192 A1 | 6/2016 | Walz |
| 2017/0039588 A1 | 2/2017 | Koltnow et al. |
| 2017/0039616 A1 | 2/2017 | Korra et al. |
| 2017/0061511 A1 | 3/2017 | Korra et al. |
| 2017/0061532 A1 | 3/2017 | Koltnow et al. |
| 2017/0140356 A1 | 5/2017 | Desai et al. |

OTHER PUBLICATIONS

"Data Security; TeamCain and 3Delta Systems Join Forces to Deliver Payment Worksuite Credit Card Processing and Security to Oracle's JD Edwards Customers", Investment Weekly News; Atlanta,, Apr. 23, 2011, 1-3.

"ePassporte—Personal Accounts", www.epassporte.com/secure/jsp/PersonalAccounts.jsp, Mar. 12, 2012, 1-4.

"VeriFone Introduces PAYware CMS8.0: Comprehensive Card Management Solution for Acquirers and Issuers Feature Increased Flexibility and Updated Security", PR Newswire; New York,, Aug. 25, 2009, 1-2.

"Wirecard Bank's new Co-Branding Program Links the Point of Sale to the Internet", PR Newswire Europe Including UK Disclose; New York,, Apr. 13, 2011, 1-2.

Martin, "In-Pocket, Phone Beaconing: Tapping into the Store Shopper", http://www.mediapost.com/publications/article/241674/in-pocket-phone-beaconing-tapping-into-the-store.html, Jan. 14, 2015, 1-3.

Guerra, Office Action for CA Application No. 2901129, dated Apr. 30, 2019, 4 pages.

"Office Action for CA App No. 2901129 dated Dec. 9, 2020, 5 pages".

* cited by examiner

600

```
ACCESSING AN APPLICATION FORM FOR ENTERING USER INFORMATION NEEDED FOR A
USER TO APPLY FOR CREDIT FOR ONE OF SAID PLURALITY OF RETAIL-BRANDED CREDIT
CARDS
610
```
↓
```
RECEIVING APPROVAL OF CREDIT FROM SAID ONE OF SAID PLURALITY OF RETAIL-BRANDED
CREDIT CARDS, SAID APPROVAL INCLUDING AN INVITATION TO DOWNLOAD A RETAIL
CREDIT CARD APPLICATION
620
```
↓
```
DOWNLOADING SAID RETAIL CREDIT CARD APPLICATION ON A MOBILE DEVICE
ASSOCIATED WITH SAID USER
630
```
↓
```
USING SAID RETAIL CREDIT CARD APPLICATION TO MAKE A PURCHASE AT A RETAIL OUTLET
ASSOCIATED WITH SAID ONE OF SAID PLURALITY OF RETAIL-BRANDED CREDIT CARDS
640
```
↓
```
RECEIVING USER SPECIFIC LOYALTY REWARDS PROVIDED TO SAID USER ON SAID MOBILE
DEVICE
645
```
↓
```
ACTIVATING A CREDIT CARD ACCOUNT TIED TO SAID USER USING SAID RETAIL CARD
APPLICATION ON SAID MOBILE DEVICE ASSOCIATED WITH SAID USER
650
```
↓
```
MANAGING AN ACCOUNT
660
```

```
┌─────────────────────────────────────────────────────────────┐
│  DOWNLOADING A RETAIL-BRANDED CREDIT CARD APPLICATION ON A  │
│              MOBILE DEVICE ASSOCIATED WITH A USER           │
│                             710                             │
└─────────────────────────────────────────────────────────────┘
                              │
                              ▼
┌─────────────────────────────────────────────────────────────┐
│ DISPLAYING A MOBILE PAYMENT CARD ON A DISPLAY SCREEN OF     │
│ SAID MOBILE DEVICES, WHEREIN SAID MOBILE PAYMENT CARD IS    │
│ LINKED TO A PAYMENT SYSTEM FOR PROCESSING TRANSACTIONS      │
│ ASSOCIATED WITH A PLURALITY OF DIFFERENT RETAIL-BRAND       │
│                       CREDIT CARDS                          │
│                             720                             │
└─────────────────────────────────────────────────────────────┘
                              │
                              ▼
┌─────────────────────────────────────────────────────────────┐
│  USING SAID MOBILE PAYMENT CARD ON SAID MOBILE DEVICE TO    │
│  MAKE A PURCHASE AT A RETAIL OUTLET ASSOCIATED WITH SAID    │
│  ONE OF SAID PLURALITY OF DIFFERENT RETAIL-BRAND CREDIT     │
│                             CARDS                           │
│                             730                             │
└─────────────────────────────────────────────────────────────┘
                              │
                              ▼
┌─────────────────────────────────────────────────────────────┐
│    RECEIVING LOYALTY PROMOTION IN RESPONSE TO MAKING        │
│                        SAID PURCHASE                        │
│                             735                             │
└─────────────────────────────────────────────────────────────┘
                              │
                              ▼
┌─────────────────────────────────────────────────────────────┐
│  DISPLAYING OPTICALLY MACHINE-READABLE INFORMATION FOR      │
│      ACCESS TO AN ACCOUNT ASSOCIATED WITH SAID USER         │
│                             740                             │
└─────────────────────────────────────────────────────────────┘
                              │
                              ▼
┌─────────────────────────────────────────────────────────────┐
│  ACCESSING AN APPLICATION FORM FOR ENTERING USER            │
│  INFORMATION NEEDED FOR A USER TO APPLY FOR CREDIT FOR      │
│  ONE OF SAID PLURALITY OF DIFFERENT RETAIL-BRAND            │
│                       CREDIT CARDS                          │
│                             750                             │
└─────────────────────────────────────────────────────────────┘
                              │
                              ▼
┌─────────────────────────────────────────────────────────────┐
│ DISPLAYING APPROVAL OF CREDIT FROM SAID ONE OF SAID         │
│ PLURALITY OF DIFFERENT RETAIL-BRAND CREDIT CARDS, SAID      │
│ APPROVAL INCLUDING AN INVITATION TO DOWNLOAD SAID           │
│               RETAIL-BRANDED CREDIT CARD                    │
│                             760                             │
└─────────────────────────────────────────────────────────────┘
                              │
                              ▼
┌─────────────────────────────────────────────────────────────┐
│                     ACCOUNT MANAGEMENT                      │
│                             770                             │
└─────────────────────────────────────────────────────────────┘
```

FIG. 7

COLLECTING AND ANALYZING DATA FROM A MOBILE DEVICE

CROSS-REFERENCE TO RELATED U.S. APPLICATION

The present patent application is a Divisional Application of and claims the benefit of co-pending U.S. patent application Ser. No. 14/584,771, filed Dec. 29, 2014, entitled "COLLECTING AND ANALYZING DATA FROM A MOBILE DEVICE" by James Walz, assigned to the assignee of the present application which is incorporated in its entirety herein.

This application is related to co-pending patent application Ser. No. 14/515,853, entitled "Retail Card Application," with filing date of Oct. 16, 2014, assigned to the assignee of the present application and hereby incorporated by reference in its entirety.

This application is related to co-pending patent application Ser. No. 14/828,773, entitled "Apply and Buy With A Co-Branded Credit Card," with filing date of Feb. 19, 2015, assigned to the assignee of the present application and hereby incorporated by reference in its entirety.

BACKGROUND

When a consumer approaches a point of sale, the consumer may not have their payment mechanism (e.g. cash, credit card, store gift card) ready and in hand. For example, the consumer may have misplaced his/her credit card or have trouble finding the credit card in his/her wallet or purse, etc.

Additionally, a user may be purchasing items at a store in which the user has a private label credit card. By using such card, the user may gain additional benefits, points, offers, or other promotions upon purchasing the items.

A company or brand may have various offers (e.g., clearance, discounts, incentives, etc.) that they would like to make to consumers. However, the company or brand may not be able to effectively or personally provide the offers to the consumer in a very direct, immediate and "in the moment" way.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 6 is a flow diagram of a method for applying for credit in accordance with one embodiment.

FIG. 7 depicts a flow diagram of using a retail card application in accordance with one embodiment.

DESCRIPTION OF EMBODIMENTS

Figure 1:
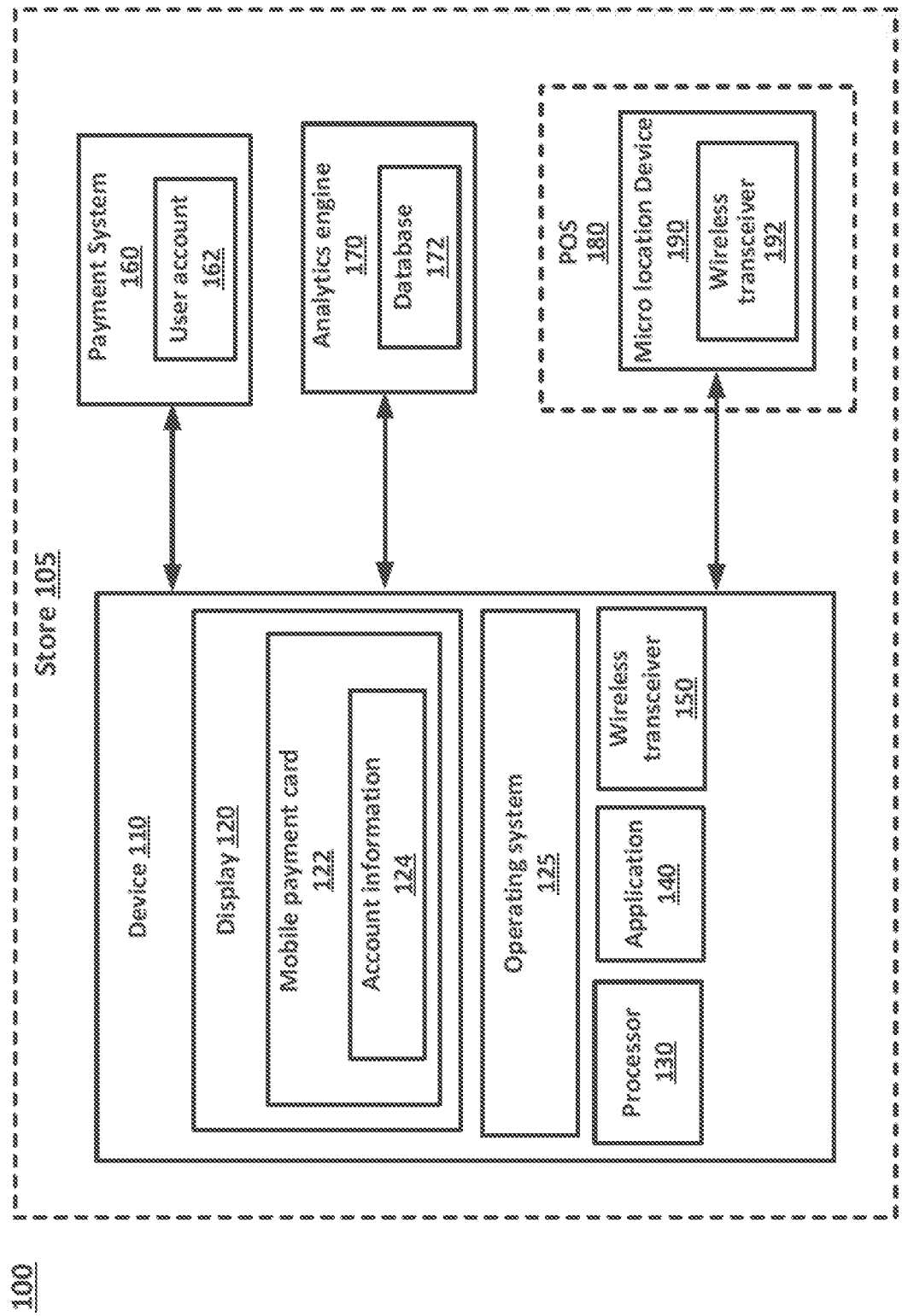
FIG. 1 is a block diagram that illustrates an embodiment of a device and payment system in accordance with one embodiment.

Reference will now be made In detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "identifying," "receiving," "downloading," "accessing," "using," "activating," "managing," "making," "displaying," "generating," "recording," "reporting," "using," "capturing," "sending," "updating," or the like, often (but not always) refer to the actions and processes of a computer system or similar electronic computing device such as, but not limited to, a portable electronic device, a display unit, an application, an information management system, a payment system, an analytics engine, a point of service (POS) device, a micro location device, a wireless transceiver or component thereof.

The electronic computing device manipulates and transforms data represented as physical (electronic) quantities within the electronic computing device's processors, registers, and/or memories Into other data similarly represented as physical quantities within the electronic computing device's memories, registers and/or other such information storage, processing, transmission, or/or display components of the electronic computing device or other electronic computing device(s).

Embodiments described provide a retail card application that can be used to replace any plastic credit card. In one embodiment, a downloadable application is provided. The application enables a user to make purchases and manage a credit account via the application. In one embodiment, the application represents a virtual credit card.

In one embodiment, the application represents a retail branded credit card or a private label credit card. In general, a private label credit card is branded for a specific retailer, independent dealer or manufacturer. In some Instances, a credit card processor system may process credit card transactions for a number of different retail branded card types.

For example, if the retailer does not manage the private label card, a third-party issues the cards and collects the payments from cardholders. Typically, terms and conditions for private label credit cards are made by contracts between the retailer and the third party. A retailer that provides the private label credit cards provides various incentives, offers, and advantages to its customers which results. In a more satisfied customer and/or increased sales. In one embodiment, mobile payment card is branded according to store.

In one embodiment, to accommodate different retail brands, the payment processing system may want to provide a configurable application that can be easily modified according to a brand's preferences. In one embodiment, a configurable application Is provided. In one embodiment, the bulk of the backend operating components of the application is generic and a custom or configurable front end is provided that can be custom tailored for a particular brand.

In one embodiment, the application facilitates the transaction phase, meaning the application provides a user interface for making credit account transactions, such as purchases, managing account preferences, managing account rewards programs, buying virtual gift cards, managing promotions, managing information driven enhancements and managing location based loyalty offers.

The result Is an application that Is easily modified from a basic chassis to give the appearance that the brand has generated a completely customized mobile payment system. This allows the payment processor to provide a unique and custom looking front end payment application without needing to completely develop an application from scratch. The bulk of the application components can be used across different brands and a custom user interface makes the application seem unique to that brand.

FIG. 1 depicts a block diagram that Illustrates an embodiment of system 100. System 100 includes device 110 that is used by a person located at store 105. Device 110 is configured to be communicatively coupled with payment system 160, analytics engine 170 and/or micro location device 190, which will be described in further detail below.

Device 110 includes display 120 that is able to display mobile payment card 122. Display 120, in one embodiment, is a touch screen, such that a user is able to interact with displayed features on the touch screen.

Device 110 may be a mobile device such as a smart phone, tablet, etc.

Device 110 includes operating system 125. In one embodiment, device 110 is an Apple IPhone™ (e.g., IPhone 4+ which includes, but is not is not limited to, iPhone 4, 4S, 5, 5S and 5C). In such an embodiment, operating system 125 is an iOS 7+ operating system. The iOS 7 operating system is a mobile operating system developed and distributed by Apple Inc.

In another embodiment, device 110 is an Android mobile device because operating system 125 is an Android mobile operating system.

Operating system 125 includes an option (e.g., on/off) as to whether or not to allow automatic Bluetooth (or Bluetooth low energy (IE)) connection with device 110. In general, Bluetooth Is a wireless technology standard for exchanging data over short distances (e.g., using short-wavelength radio waves in the ISM band from 2.4 to 2.485 GHz) from fixed and/or mobile devices.

In one embodiment, operating system 125 includes an ON default setting that automatically enables device 110 to have a Bluetooth connection with other devices. As a result device 110 will automatically accept a Bluetooth Invitation from other devices.

For example, micro location device 100 transmits a Bluetooth Invitation via wireless transceiver 192. If device 110 is in range of the transmitted Bluetooth invitation, then device 110 automatically sends a message back to micro location device 190 via wireless transceiver 150 to accept the Bluetooth invitation. Accordingly, there is an automatic Bluetooth connection between device 110 and micro location device 190.

Micro location device 190 is any device that Is configured to be communicatively coupled with device 110 For example, micro location device 190 is a NFC enabled device.

In one embodiment, micro location device 190 is an iBeacon™, which is an indoor positioning system from Apple Inc. For example, the iBeacon is a low-powered, low-cost transmitter that can notify nearby iOS 7 (and/or Android) devices of their presence.

Additionally, a users mobile app (e.g., application 140) can be enabled to look for the transmission of micro location device 190 (or any other micro location devices). When device 110 is within physical proximity to the micro location device and detects it, the application can notify the customer of location-relevant content, promotions, and offers which will be described in further detail below.

Mobile payment card 122 can be any digital payment card that is able to be displayed on display 120 and utilized for purchases. In one embodiment, mobile payment card 122 is implemented via application 140. That is, application 140 (e.g., a mobile application) is downloaded onto device 110. When a user of device 110 selects application 140 to be utilized, processor 130 executes application 140 such that mobile payment card 122 is displayed on display 120. In another embodiment, mobile payment card 122 is supported by being downloaded over the Internet.

In one embodiment, mobile payment card 122 is a mobile credit card or a digital credit card. That is, the mobile payment card 122 is an electronic or digital version of a physical credit card. Mobile payment card 122 can also be referred to as mobile virtual credit card. In one embodiment, the mobile payment card 122 is a payment card directly associated with the store 105, such as a retail-branded credit card that can only be used to make purchases at stores with the same brand as store 105. In one embodiment, the issuer of mobile payment card 122 is the store 105.

In general, a credit card is issued to users or consumers as a system of payment. It allows the cardholder to pay for goods and services based on the holder's promise to pay for them. The issuer of the card creates a revolving account and grants a line of credit to the consumer (or the user) from which the user can borrow money for payment to a merchant or as a cash advance to the user.

In one embodiment, mobile payment card 122 is a branded private label credit card, in general, a private label credit card is branded for a specific retailer, independent dealer or manufacturer. If the retailer does not manage the private label card, a third-party issues the cards and collects the payments from cardholders. Typically, terms and conditions for private label credit cards are made by contracts between the retailer and the third party.

A retailer that provides the private label credit cards provides various incentives, offers, and advantages to its customers which results in a more satisfied customer and/or increased sales, in one embodiment, mobile payment card 122 is branded according to store 105.

In various embodiments, mobile payment card 122 may be a mobile debit card, mobile cash card, mobile gift card, etc.

Mobile payment card 122 includes account information 124. Account Information 124 can include, but is not limited to, name of user, billing address, account number, account balance/limit, card provider information, etc.

In one embodiment, account information is optically machine readable information. Optically machine readable information is any machine readable (or scan-able) information that is able to be displayed on display 120 that enables access to or information related to user account 162 of payment system 160.

The optically machine readable information can be displayed in the form of a bar code (1D, 2D), quick response (QR) code, matrix code, etc.

In another embodiment, account information is the account number. For example, the consumers account number is displayed.

In various embodiments, access to or information related to user account 162 may be accomplished by various means, such as, but not limited to, audio signals, Bluetooth low energy (LE), near field communication (NFC), etc.

Payment system 160 is any payment entity or mechanism that allows for purchases based on mobile payment card 122. For example, payment system 160 is an entity that issued mobile payment card 122 such as a bank, a corporation, etc. In one embodiment, payment system 160 processes retail branded credit card transactions for a plurality of different brands.

In various embodiments, store 105 is a store or location with goods and/or services for sale. In one example, store 105 is a business/corporation such as Target™, Victoria Secret™, REI™, Gap™, etc. It is appreciated that the store 105 could be a virtual store, such as an online shopping store.

While at store 105, the customer is in possession of device 110. Moreover, the customer has a user account 162 associated with store 105. For example, a customer enters a Target™ store with the intention to peruse items for sale and potentially purchase Items at store 105. The customer also has a Target™ private label credit card.

More specifically, application 140 is provided by store 105. For example, application 140 is a mobile application provided by Target™.

As such, application 140 enables mobile payment card 122 (e.g., a virtual credit card) to be displayed or surfaced on display 120 of device 110, which will be described In further detail below.

Micro location device 190 is at or in proximity to point of sale (POS) 180 When the customer approaches the point of sale (POS), such as a register, with items for purchase, device 110 enters the range of the micro location device 190. For example, micro location device 190 transmits (e.g., broadcasts) a Bluetooth invitation having a range (e.g., 12-36 inches). Once In the micro location device's range, device 110 receives the Bluetooth (e.g., Bluetooth LE) Invitation from micro location device 190. In response, device 110 sends a signal back to micro location device 190 via wireless transceiver 150. As a result, micro location device 190 is able to recognize various Information associated with device 110 (e.g., phone ID, etc.) and a connection is made between device 110 and micro location device 190.

Additionally, in response to device 110 entering in the range of micro location device 190 and a connection between device 110 and micro location device 190, the consumer is prompted via display 120 if they would like mobile payment card 122 and/or account information 124 to be displayed (or surfaced). In one embodiment, micro location device 190 transmits instructions to device 110 to initiate the prompt to the consumer (e.g., the user of device 110).

A specific Micro location device could be program/set up "anywhere" within the retailers store to trigger via Bluetooth LIE the opening of the "mobile payment card" and thus replacing the existing security requirements of ID/Password resulting in a more timely and user friendly consumer interaction between the merchant and the consumers mobile payment card. This also allows mobile payments to be transacted where/when the consumer wishes to purchase within the retail store alleviating fixed POS.

If the consumer accepts, then mobile payment card 122 is displayed on display 120. Accordingly, mobile payment card 122 is readily displayed and available to the consumer for immediate purchase of goods/services at POS 180.

In one embodiment, account information 124 is displayed in the form of optically machine readable Information (e.g., 2D barcode). As such, an optical scanner (e.g., bar code reader) at POS 180 is able to scan the account information for purchase of the goods/services.

In another embodiment, account information 124 is the account number. As such, the account number is read from display 120 and entered at POS 180 for purchase of the goods/services.

In one embodiment, authentication or security credentials are required prior to display of account information 124. The authentication/security credentials can be but are not limited to a PIN, finger/thumb print, voice command, etc. In one example, a user is prompted to enter a 4 digit PIN. In response to the correct PIN entered, account information 124 is displayed.

Figure 2B:
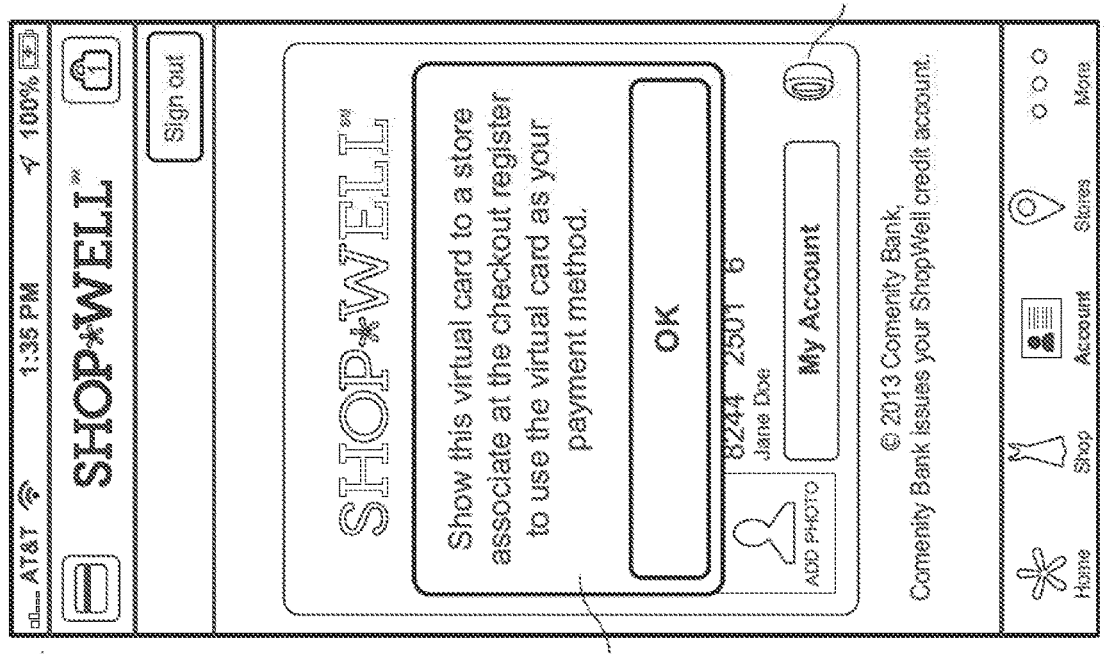
FIG. 2B illustrates an embodiment of device displaying a mobile payment card In accordance with one embodiment.
Figure 2A:
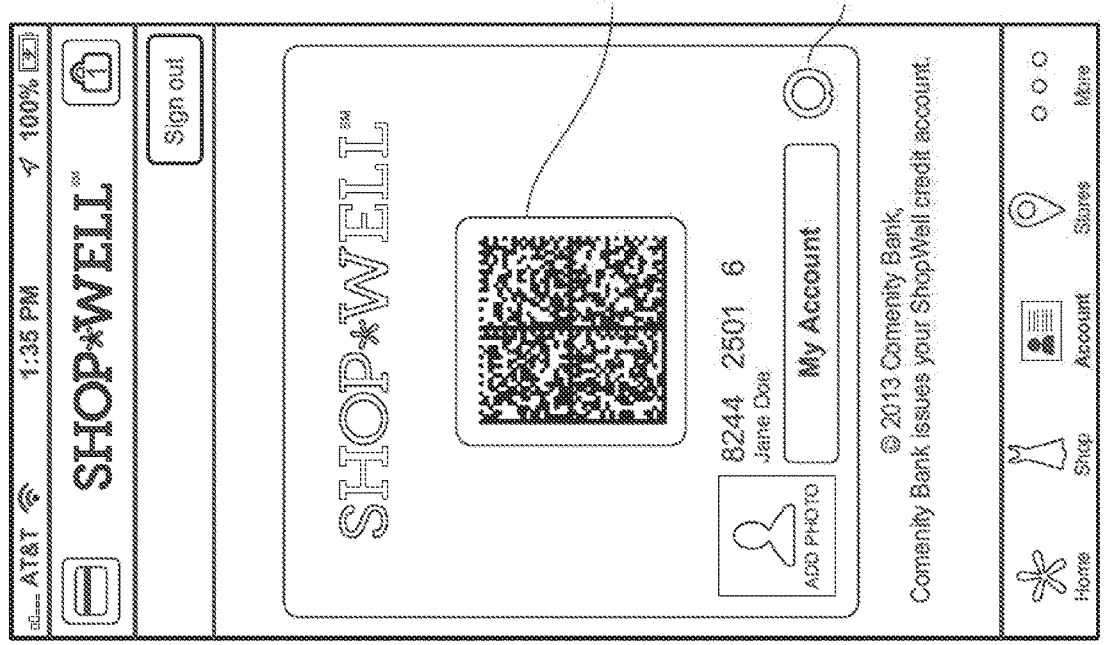
FIG. 2A illustrates an embodiment of device displaying a mobile payment card In accordance with one embodiment.

FIGS. 2A and 2B depict embodiment s of mobile payment card 210 displayed on a mobile device. Mobile payment card 210 includes optically machine readable information 124 (i.e., QR code) and may include an animated digital watermark 126.

During use, at the point of sale, the user of the mobile device shows a merchant mobile payment card 210 that is displayed on the touch screen. The merchant will be able to see animated digital watermark 126 and determine that mobile payment card 210 is authentic. Additionally, in response to animated digital watermark 126 being touched (e.g., by the user or merchant) message 230 is displayed, as depicted in FIG. 2B.

Message 230 can be information/message that provides visual evidence that the displayed mobile payment card 210 is not a fraudulent captured video of the authentic mobile payment card.

Figure 3:
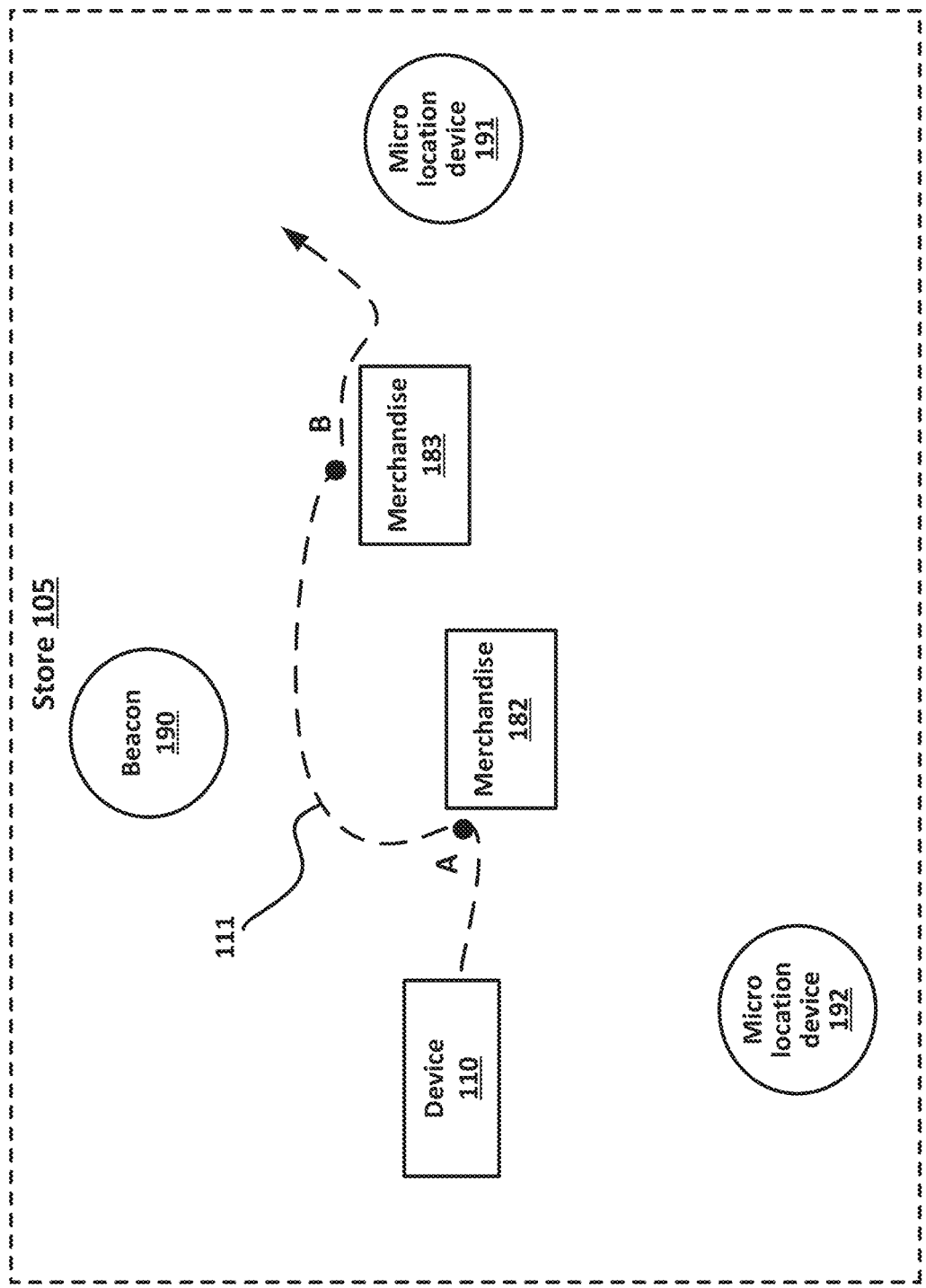
FIG. 3 depicts a device moving through a retail store in accordance with one embodiment.

FIG. 3 depicts an embodiment of a block diagram of a consumer in possession of device 110 walking within store 105. Once the consumer enters store 105, device 110 is connected to one or more of micro location devices 190, 191 and 192. Although three micro location devices are depicted, any number of micro location devices may be employed within store 105 and communicating with device 110

In response to device 110 being connected with a micro location device, various user information associated with the user of device 110 may be obtained. The information may be stored in database 172. The information can be information provided by the user (e.g., name, birthday, address, age, number of children, etc.). The information may be provided via application 140 or during initiation of user account 162.

The user associated information may be any information derived from previous transactions or any other obtained Information from various means. More specifically, analytics engine 170 may gather any data associated with the user and analyze such data and generate user associated information. For example, a user may typically purchase items towards the end of the month or on his wife's birthday. Accordingly, analytics engine generate information regarding the user that the user is inclined to purchase other items towards the end of the month or on near his wife's birthday.

Additionally, analytics engine 170 may analyze information from thousands of other users and generate purchasing patterns and apply such patterns and analysis to other users. Such information is stored in database 172. In one embodiment, the analytics engine 170 may access location information about the user from sources other than from micro location devices 191 and 192 or beacon 190. For example, analytics engine 170 may access location information from a gps device associated with the user's mobile device. This location Information can be used to generate location specific ads or offers that can be provided to the user.

Analytics engine 170 may be a part of customer loyalty program. For example, analytics engine 180 facilitates in the execution a scalable plan to enhance marketing and customer engagement strategies. Also, engine may facilitate growing a business through data-driven loyalty and marketing solutions.

More specifically, for example, the information provided by analytics engine 170 indicates that the consumer in possession of device 110 has wife whose birthday is in two days. Therefore it can be presumed that the consumer has high likelihood to be influence-able to purchase an item at store 105.

The employees of store 105 (or sales associates) are provided the consumers information. For example, the information may be displayed on mobile devices in possession of the store employees.

Various discounts and incentives to drive offers to consumers may be derived from the values generated by the analytics engine. For example, a promotion may be provided to the consumer for all women's apparel because his wife's soon to be birthday. The promotion may be displayed on display 120.

Referring to FIG. 3, micro location devices 190, 191 and 192 may be utilized to determine the location of the consumer via the connection between the device and the micro location devices. That is, the micro location devices may use various methods to determine the location of the consumer within store 105. For example, the system of micro location devices may use triangulation to determine the exact location of the device. In particular, the device transmits signals to the micro location devices. The micro location devices can determine the angles and distance with respect to the device and determine the location of the device within store 105. Location information can also be gathered from other sources, such as a gps device associated with the user's mobile device.

The micro location devices are able to track the consumer while the consumer walks along path 111 throughout the store. For example, the consumer stops at location A to look at merchandise 182 for a duration of time, then moves along path 111 to location B to look at merchandise 183 for a duration of time, and so on.

While in store 105, the consumer is prompted via device 110 that offers are available. For example, an offers button is displayed on display 120. If the user accepts the offers then various offers are displayed to the user.

More specifically, offers are provided to the consumer that relate to the consumers particular location. For example, while the consumer is at location A, looking at merchandise 182, a promotion or sale for merchandise 182 is provided to the consumer via device 110. Similarly, while consumer is at location A, looking at merchandise 183, a promotion or sale for merchandise 183 is provided to the consumer via device 110.

In another embodiment, consumer has a history of buying a particular item (e.g., brown sweaters) within merchandise 182. This information is provided via analytics engine 170. Accordingly, a promotion for brown sweaters Is provided on display 120 while the consumer is at location 182 in the immediate proximity to brown sweaters.

In general, embodiments described herein include a system that provides offers to a consumer based on consumer location within the store and/or previous consumer actions (e.g., previous purchases, previous paths in store, etc.).

As described above, the system of micro location devices can track the path of the consumer via device 110 Analytics engine 170 can access the consumers locations and tracked path and correlate the information with various other consumer related information. As a result, additional analytical information can be generated that is based on the location of the consumer. This information can be utilized as a conversion tool.

In particular, the locations that the consumer stops is determined (e.g., location A and location B). Additionally, the consumers path 111 is tracked by the micro location devices and the information is provided to analytics engine 170.

In some embodiments, the consumer's location is determined by the micro location devices within 12 inches of the consumers actual location.

In one example, a user is prompted via display 120 that he/she will receive 500 loyalty points if the consumer agrees to being tracked within store 105. As such, in response to accepting the invitation, the consumer receives the additional loyalty points.

Information may be correlated with the consumers location to increase conversion. Such information can be, but is not limited to, amount purchased, number of trips to store, shopping on web, etc.

Figure 4:
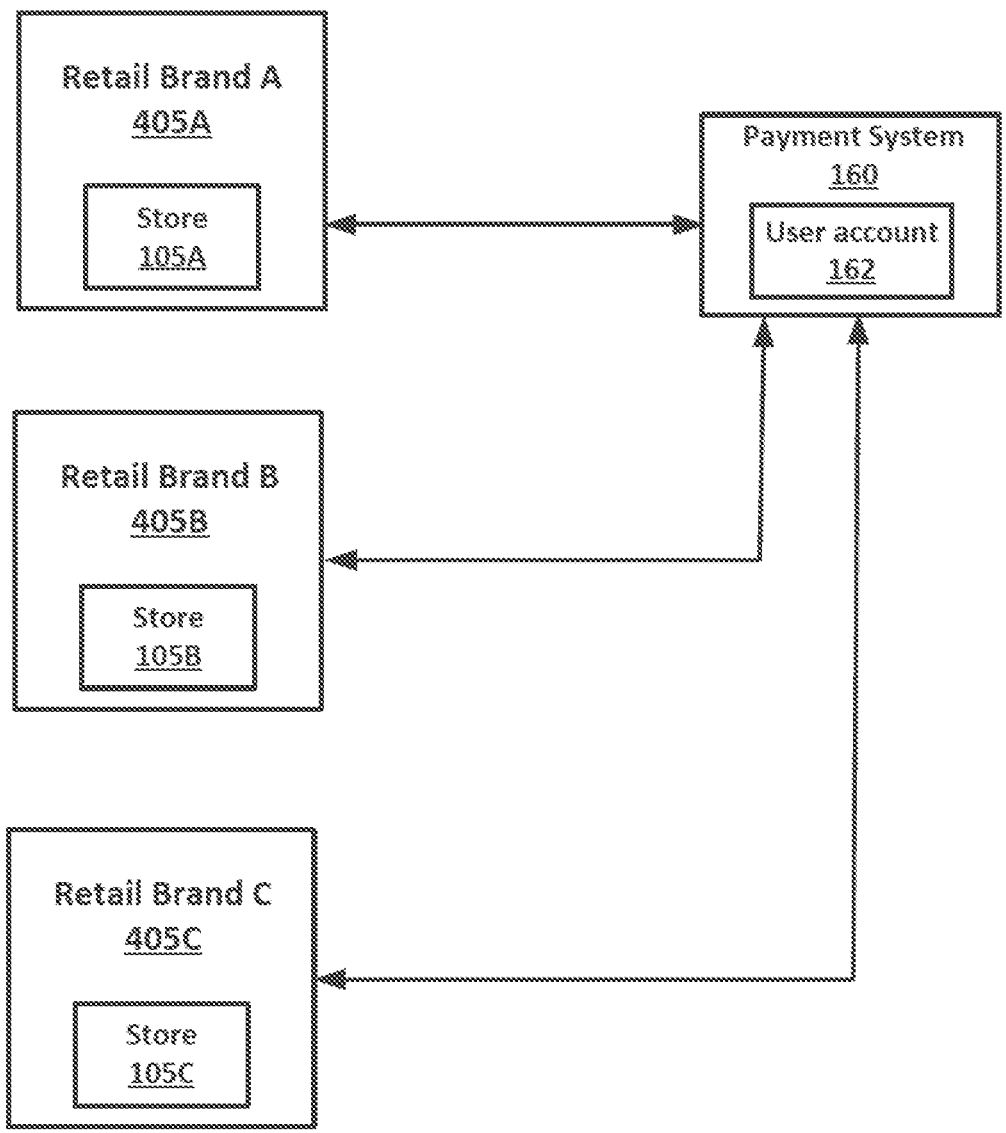
FIG. 4 depicts a plurality of retail brands serviced by a payment system in accordance with one embodiment.

FIG. 4 shows a diagram of a single payment system 160 servicing a plurality of retail brands 405A, 405B and 405C. Retail brand 405A has an associated store 105A. Retail brand 405B has an associated store 105B. Retail brand 405C has an associated store 105C. Embodiments described provide a configurable retail card application that can be used across different brands with the appearance that each of the brands has a unique mobile credit application. For example, a generic back end of the retail credit card application can be used to service credit card transactions from retail brands 405A, 405B and 405C while a configurable front end is customized according to each brand.

Figure 5:
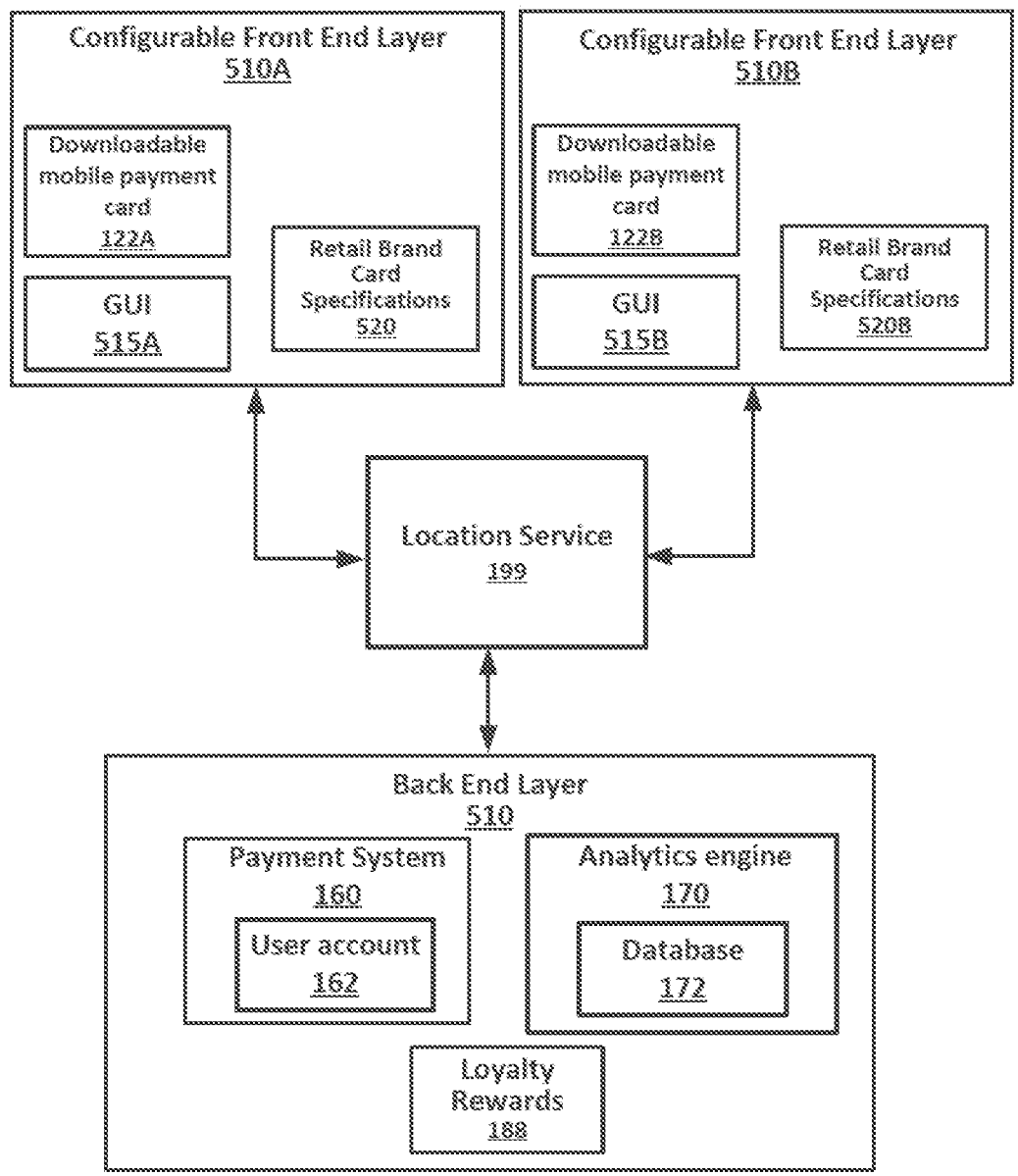
FIG. 5 depicts a retail card application system In accordance with one embodiment.

FIG. 5 shows a retail credit card application 500 comprising a back end layer 510, configurable front ends layers 510A and 510B and location service 199. It is appreciated that the number of configurable front end layers is unlimited, it is also appreciated that there could be any number of back end layers 510. The location service 199 compiles location information about a user so that targeted rewards offers can be provided to the user to provide information driven enhancement of a users experience.

In one embodiment, application platform 500 processes a plurality of retail-branded credit cards. The application platform 500 includes a configurable front end (510A and 510B) comprising a graphical user interface layer (515A and 515B) that Is configurable to a specific one of the plurality of retail-branded credit card. In one embodiment, the front end layer is configured according to the retail brand card specifications 520A and 520B.

The application platform 500 also includes backend layer 510 comprising credit card functionality (payment system 160) for directly performing credit card transactions associated with the specific one of the plurality of retail-branded credit cards. The payment system 160 includes user account information 162 used for processing credit-based transactions.

In one embodiment, the backend directly performs credit card transactions associated with all of the plurality of retail-branded credit cards in this example, the payment system 160 processes credit-based transactions associated with more than one retail brand.

In one embodiment, the front end layer 510A includes a downloadable portion 122A and 122B for installation on devices associated with users, wherein the downloadable portion can be used directly for approving credit issuance to the user. In this example, a downloadable application can be used to apply for credit. In another embodiment, a user may manage account information related to a line of credit at a retail brand directly from the application.

In one embodiment, the front end 510A provides location specific promotional ads to the user based on location information associated with user. In one embodiment, promotional offers are presented on the user interface 515A and 515B. In one embodiment, the location service 199 facilitates location based shopping enhancement by providing location specific offers and loyalty rewards. In one embodiment, the loyalty rewards module 188 uses account Information in combination with location information to drive location based rewards offers to users.

In one embodiment, the front end provides reward points to the user in response to the user completing a transaction using a specific one of a plurality of retail-branded credit cards 520A and 520B.

In one embodiment, the front end provides a payment interface that enables the user to pay a bill associated with a specific one of the plurality of retail-branded credit cards. The payment may be processed via payment system 160.

In one embodiment, the front end provides a mobile receipt associated a transaction using a specific one of the plurality of retail-branded credit cards to the user, in one embodiment, the user account 162 stores transaction receipts in a form that can be provided to the user on GUI 515A and 515B.

In one embodiment, the front end provides a gift card store front that enables a user to purchase a gift card using a specific one of the plurality of retail-branded credit cards. In one embodiment, a gift card can be purchased in the name of the gift recipient and the recipient will receive a virtual credit card in their name.

In another embodiment, the application 505A can be used directly for creating a credit account for a user, in another embodiment, the downloadable portion 505A can be used directly for using earned credit card rewards points associated with a user, in another embodiment, the downloadable portion 505A can be used directly for buying items at a store associated with the specific one of the plurality of retail-branded credit cards. In one embodiment, the downloadable portion 505A can be used directly for receiving promotions associated with the specific one of the plurality of retail-branded credit cards.

Example Methods of Operation

The following discussion sets forth in detail the operation of some example methods of operation of embodiments. With reference to FIGS. 6 and 7, flow diagrams 600 and 700 illustrate example procedures used by various embodiments. Flow diagrams 600 and 700 include some procedures that, in various embodiments, are carried out by a computer, such as computer system 802 of FIG. 8 described below. The computer having a processor under the control of computer-readable and computer-executable instructions. In this fashion, procedures described herein and in conjunction with flow diagrams 600 and 700 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. device 110, payment system 150, etc.).

The computer-readable and computer-executable instructions, which reside on tangible computer readable storage media, are used to control or operate in conjunction with, for example, one or some combination of processors of the computer environments. It is appreciated that the processor(s) may be physical or virtual or some combination (it should also be appreciated that a virtual processor is implemented on physical hardware). Although specific procedures are disclosed In flow diagrams 600 and 700, such procedures are examples. That is, embodiments are well suited to performing various other procedures or variations of the procedures recited in flow diagrams 600 and 700. Likewise, in some embodiments, the procedures in flow diagrams 600 and 700 may be performed In an order different than presented and/or not all of the procedures described in one or more of these flow diagrams may be performed. It is further appreciated that procedures described in flow diagrams 600 and 700 may be implemented In hardware, or a combination of hardware with firmware and/or software.

FIG. 6 shows a flow diagram of an exemplary method 600 for applying for credit on a mobile device In accordance with an embodiment. The method of applying for credit on a mobile device includes at 610 accessing an application form for entering user Information needed for a user to apply for credit for one of the plurality of retail-branded credit cards. In one embodiment, the credit application form Is accessed at a mobile device, such as device 110.

At 620, method 600 includes receiving approval of credit from the one of the plurality of retail-branded credit cards, the approval including an invitation to download a retail credit card application. In one embodiment, a downloadable retail credit card application is only available to users that have successfully applied for credit and have been approved for credit by a retail brand.

At 630, method 600 includes downloading the retail credit card application on a mobile device associated with the user. In one embodiment, the application is downloaded from an online application store. In one embodiment, a fee is charged for downloading the application.

At 640, method 600 includes using the retail credit card application to make a purchase at a retail outlet associated with the one of the plurality of retail-branded credit cards. In one embodiment, the purchase Is made at a physical retail store. In another embodiment, the purchase is made through an online shopping site.

At 645, method 600 includes receiving user specific loyalty rewards provided to the user on the mobile device. In one embodiment, the loyalty rewards are location specific and users are presented with offers based on their location. In another embodiment, the rewards are situational based, such as offering a coupon upon the completion of a purchase.

At 650, method 600 includes activating a credit card account tied to the user using the retail card application on the mobile device associated with the user. In one embodiment, new card activation can be accomplished by a user using the mobile retail card application. In this way, approval, issuance and activation can all be performed via device 110. In one embodiment, the rewards offers are presented in response to the activation of the card performed in 650.

At 680, method 600 includes managing an account and can include such activities as managing earned credit card rewards points associated with a user using the retail credit card application, receiving promotional information associated with the one of the plurality of retail-branded credit cards, making a payment for a purchase at the retail outlet associated with the one of the plurality of retail-branded credit cards using the retail credit card application.

In one embodiment, 660 can include account activities such as paying a bill, redeeming rewards points, purchasing a gift card, managing account information, managing mobile receipts, etc.

FIG. 7 shows a flow diagram of an exemplary method 700 for using an application-based credit card on a mobile device in accordance with an embodiment.

At 710, method 700 includes downloading a retail-branded credit card application on a mobile device associated with a user.

At 720, method 700 includes displaying a mobile payment card on a display screen of the mobile device, wherein the mobile payment card is linked to a payment system for processing transactions associated with a plurality of different retail-brand credit cards.

At 730, method 700 includes using the mobile payment card on the mobile device to make a purchase at a retail outlet associated with the one of the plurality of different retail-brand credit cards.

At 735, method 700 includes receiving loyalty promotion in response to making the purchase. In one embodiment, the loyalty promotion is location based.

At 740, method 700 includes displaying optically machine-readable information for access to an account associated with the user.

At 750, method 700 includes accessing an application form for entering user information needed for a user to apply for credit for one of the plurality of different retail-brand credit cards.

At 760, method 700 includes displaying approval of credit from the one of the plurality of different retail-brand credit cards.

At 770, method 700 includes account management and may include activities such as activating a credit card account associated with a user using the retail card application on the mobile device associated with the user, managing earned credit card rewards points associated with the user using the retail credit card application, receiving promotional information associated with the one of the plurality of retail-branded credit cards using the retail credit card application, making a payment for a purchase using the retail credit card application.

In one embodiment, 770 includes initiating a communication with the user via their electronic device. In one embodiment, the communication may include offers and loyalty rewards that can be personalized for the user based on transaction history and may be based on location information associated with the user.

Data Collection and Analytics

At platform standpoint, data can be collected through various delivery channels and then the engine would pull data down so it will know if you got the statement that says you got the statement, a push message you got that data. And then you would go on with your back end of taking that data, bring it from different channels or triggers into one data collection and could analyze around that.

In one embodiment, the backend 510 collects user data from mobile devices to aid in targeting delivery of special offers and incentives, in one embodiment, the configurable front end 510A of 510B enables user data to be collected and sent to the backend layer 510 where it can be compiled and analyzed to drive delivery of incentive offers such as coupons or rewards points offers.

Figure 8:
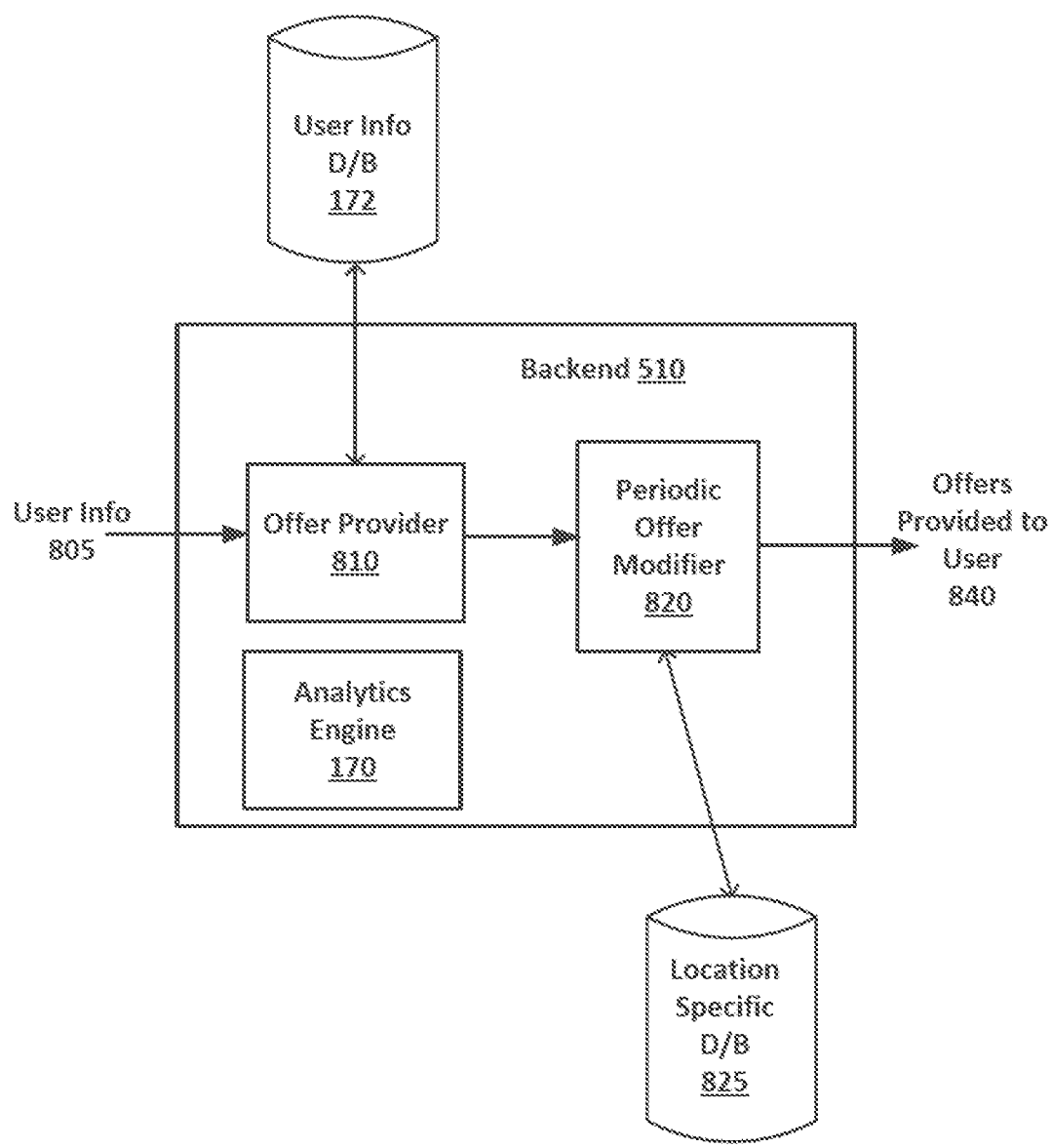
FIG. 8 is a block diagram of a user data collection layer, in accordance with an embodiment.

FIG. 8 shewn an exemplary backend layer 510 that receives user information 810 from mobile devices associated with users of a credit card. In one embodiment, the user information is collected with the knowledge and consent of the user with the understanding that providing the information can result in personalized incentive offers The collected user information is stored in a user info database 172.

The backend 510 also includes an offer provider 810 that uses analytics engine 170 and the information in database 172 to generate offers to the user. In one embodiment, the analytics engine determines at least one buyer attribute that can be used to deliver offers 840 to the user.

Periodically, the offers are modified by the periodic offer modifier 820. For example, in one embodiment, location specific offers can be presented to the user with the aid of the location specific database 825. When a particular user shares his location, location specific offers from the location specific database 825 can be delivered to the user.

In one embodiment, offers provided to the user 840 includes the ability to target out contextually relevant messages to a user based on time, location or where that person is, so instead of just blasting e-mail or putting something out here, the user is delivered a contextually relevant information delivered to them at the right time and location to drive action on that purchase.

Using this time and location in sending you the example used, maybe you get something on your mobile two weeks prior to a sale within a text, the day before the sale, an in-store or even more contextually relevant because it's using your location.

One embodiment provides a kind of consumer journey but they are getting the right messages at the right time and they resonate with the user.

One embodiment includes pushing a message to that mobile commerce (M-Commerce) site so that when you go to the M-Commerce Site and you're on a certain page, the backend layer can send a user a pop-up message that they will only see on their mobile device. This would be at the E-Commerce site.

Figure 9:
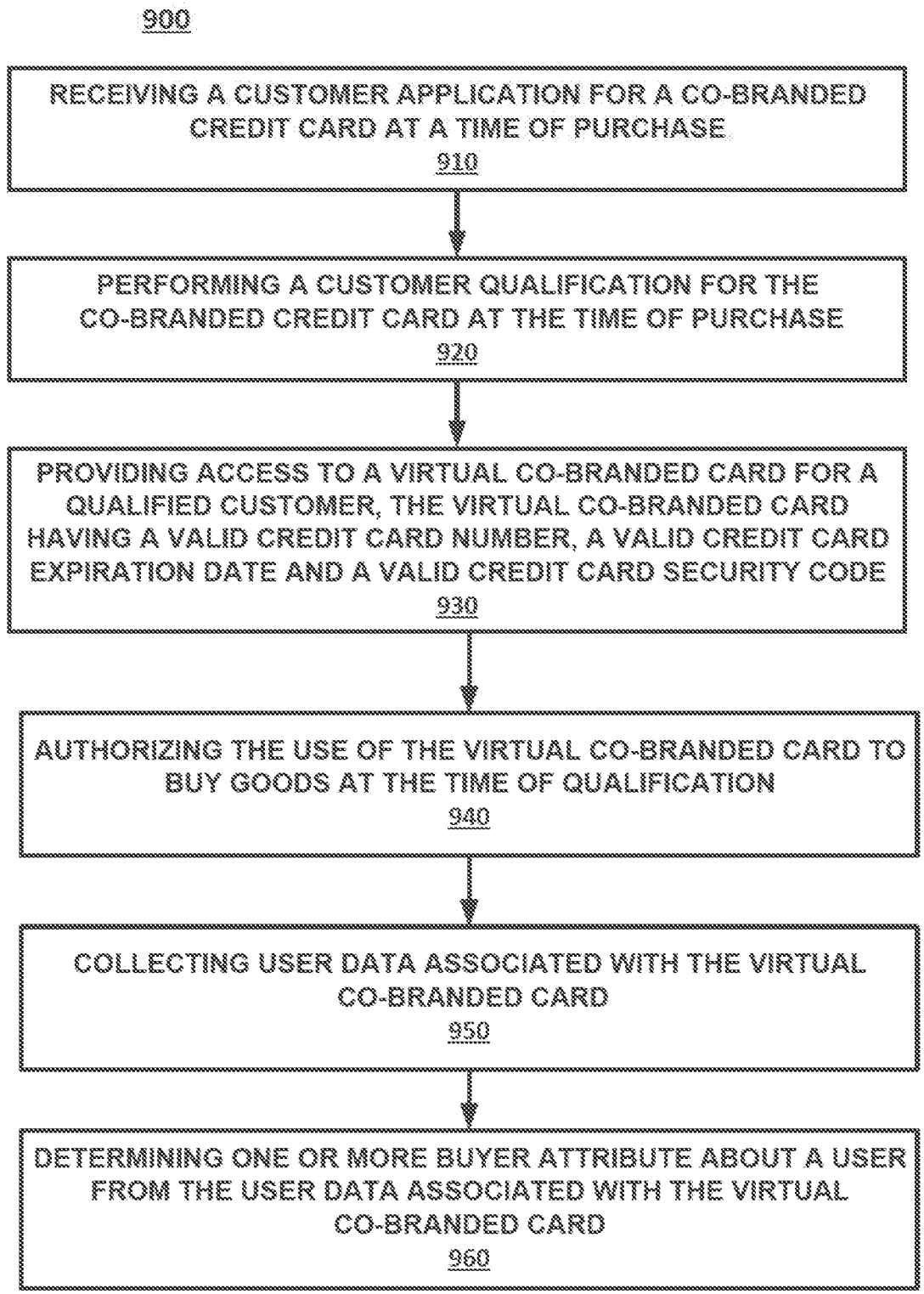
FIG. 9 depicts a flow diagram for a method for collecting user information, in accordance with an embodiment.

FIG. 9 depicts a flow diagram for a method 900 of a method for collecting user information associated with a co-branded virtual card.

At 910, method 900 includes receiving a customer application for a co-branded credit card at a time of purchase.

At 920, method 900 includes performing a customer qualification for the co-branded credit card at the time of purchase.

At 930, method 900 includes providing access to a virtual co-branded card for a qualified customer, the virtual co-branded card having a valid credit card number, a valid credit card expiration date and a valid credit card security code.

At 940, method 900 includes authorizing the use of the virtual co-branded card to buy goods at the time of qualification.

At 950, method 900 includes collecting user information associated with said virtual co-branded card.

At 960, method 900 includes determining one or more buyer attribute about a user from the user data associated with the virtual co-branded card.

Figure 10:
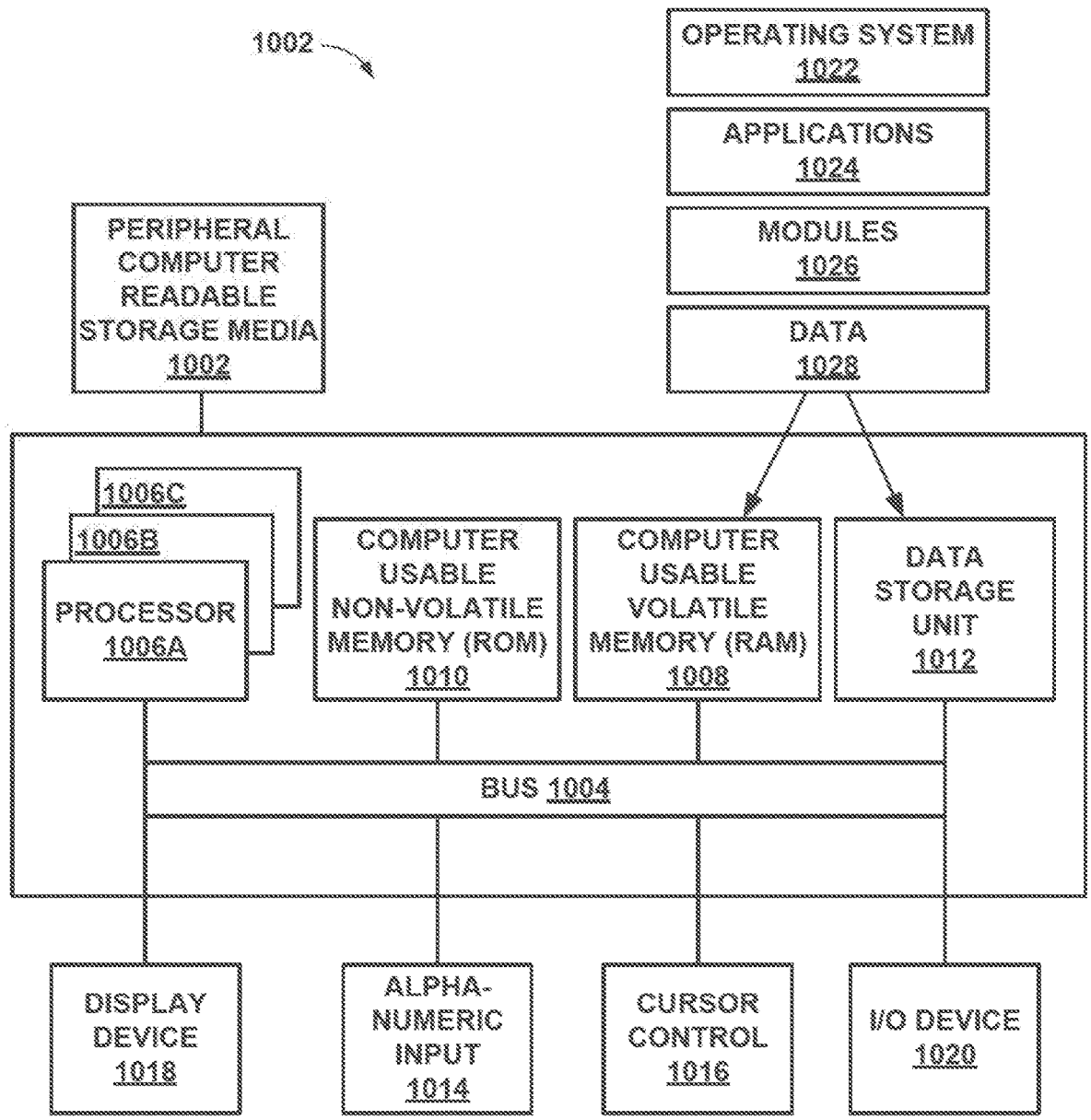
FIG. 10 depicts a block diagram of an exemplary computer system in accordance with one embodiment.

With reference now to FIG. 10, all or portions of some embodiments described herein are composed of computer-readable and computer-executable instructions that reside, for example, in computer-usable/computer-readable storage media of a computer system. That is, FIG. 10 illustrates one example of a type of computer system that can be used in accordance with or to implement various embodiments which are discussed herein. It is appreciated that computer system 1002 of FIG. 10 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like.

Computer system 1002 of FIG. 10 is well adapted to having peripheral computer-readable storage media 1002 such as, for example, a floppy disk, a compact disc, digital versatile disc, universal serial bus "thumb" drive, removable memory card, and the like coupled thereto.

Computer system 1002 of FIG. 10 includes an address/data bus 1004 for communicating information, and a processor 1006A coupled to bus 1004 for processing information and instructions. As depicted in FIG. 10, computer system 1002 is also well suited to a multi-processor environment in which a plurality of processors 1006A, 1006B, and 1006C are present. Conversely, computer system 1002 is also well suited to having a single processor such as, for example, processor 1006A. Processors 1006A, 1006B, and 1006C may be any of various types of microprocessors. Computer system 1002 also includes data storage features such as a computer usable volatile memory 1008, e.g., random access memory (RAM), coupled to bus 1004 for storing information and instructions for processors 1006A, 1006B, and 1006C.

Computer system 1002 also includes computer usable non-volatile memory 1010, e.g., read only memory (ROM), and coupled to bus 1004 for storing static information and instructions for processors 1006A, 1006B, and 1006C. Also present in computer system 1002 is a data storage unit 1012 (e.g., a magnetic or optical disk and disk drive) coupled to bus 1004 for storing Information and instructions. Computer system 1002 also includes an optional alphanumeric input device 1014 including alphanumeric and function keys coupled to bus 1004 for communicating information and command selections to processor 1006A or processors 1006A, 1006B, and 1006C.

Computer system 1002 also includes an optional cursor control device 1016 coupled to bus 1004 for communicating user input information and command selections to processor 1006A or processors 1006A, 1006B, and 1006C. In one embodiment, computer system 1002 also includes an optional display device 1018 coupled to bus 1004 for displaying information.

Referring still to FIG. 10, optional display device 1018 of FIG. 10 may be a liquid crystal device, cathode ray tube, plasma display device, projector, or other display device suitable for creating graphic images and alphanumeric characters recognizable to a user. Optional cursor control device 1016 allows the computer user to dynamically signal the movement of a visible symbol (cursor) on a display screen of display device 1018 and indicate user selections of selectable items displayed on display device 1018. Many Implementations of cursor control device 1016 are known in the art including a trackball mouse, touch pad, joystick or special keys on alphanumeric input device 1014 capable of signaling movement of a given direction or manner of displacement, in another embodiment, a motion sensing device (not shown) can detect movement of a handheld computer system.

Examples of a motion sensing device in accordance with various embodiments include, but are not limited to, gyroscopes, accelerometers, tilt-sensors, or the like. Alternatively, it will be appreciated that a cursor can be directed and/or activated via input from alphanumeric input device 1014 using special keys and key sequence commands. Computer system 1002 is also well suited to having a cursor directed by other means such as, for example, voice commands, in another embodiment, display device 1018 comprises a touch screen display which can detect contact upon its surface and interpret this event as a command. Computer system 1002 also includes an I/O device 1020 for coupling computer system 1002 with external entitles. For example, in one embodiment, I/O device 1020 is a modem for enabling wired or wireless communications between system 1002 and an external network such as, but not limited to, the Internet.

Referring still to FIG. 10, various other components are depicted for computer system 1002. Specifically, when present, an operating system 1022, applications 1024, modules 1026, and data 1028 are shown as typically residing in one or some combination of computer usable volatile memory 1008 (e.g., RAM), computer usable non-volatile memory 1010 (e.g., ROM), and data storage unit 1012. In some embodiments, all or portions of various embodiments described herein are stored, for example, as an application 1024 and/or module 1026 in memory locations within RAM 1008, computer-readable storage media within data storage unit 1012, peripheral computer-readable storage media 1002, and/or other tangible computer-readable storage media.

Example embodiments of the subject matter are thus described. Although various embodiments of the have been described In a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

The invention claimed is:

1. A method for collecting user information associated with a co-branded virtual card, said method comprising:
receiving, at a computer system and from a mobile device of a customer, an application for a co-branded credit card;
performing, via said computer system, a customer qualification for said co-branded credit card;
providing, from said computer system and to said mobile device, a virtual co-branded card for a qualified customer, said virtual co-branded card having a valid credit card number, a valid credit card expiration date, and a valid credit card security code;
utilizing a micro location device communicatively coupled with said computer system to wirelessly communicate with said mobile device and determine a location of said mobile device;
generating a customer notification based on said location of said mobile device;

providing said customer notification to said mobile device;

authorizing, via said computer system, a use of said virtual co-branded card to buy goods at a time of qualification;

utilizing said micro location device to wirelessly communicate with said mobile device and open said virtual co-branded card on said mobile device;

performing a wireless mobile payment transaction with said virtual co-branded card, said mobile payment transaction performed between said micro location device and said mobile device;

collecting, at said computer system and from said mobile device and after said performing said wireless mobile payment transaction, said user information associated with said virtual co-branded card wherein said user information is transmitted from said mobile device to said computer system, said user information comprising: a device identifier of said mobile device, and previous transaction data; and determining, at said computer system, one or more buyer attributes for said customer from said user information associated with said virtual co-branded card.

2. A method for collecting user data associated with a co-branded virtual card, said method comprising:

qualifying, at a computer system, a customer for a co-branded credit card;

providing, from said computer system and to a mobile device of said customer, a virtual co-branded card;

utilizing a micro location device communicatively coupled with said computer system to wirelessly communicate with said mobile device and determine a location of said mobile device;

generating a customer notification based on said location of said mobile device;

providing said customer notification to said mobile device;

utilizing said micro location device to wirelessly communicate with said mobile device and open said virtual co-branded card on said mobile device;

performing a credit-based transaction using said virtual co-branded card at a time of qualification, said credit-based transaction performed wirelessly between said micro location device and said mobile device;

collecting, at said computer system and after said performing said credit-based transaction, said user data associated with said virtual co-branded card, wherein said user data is transmitted from said mobile device to said computer system, said user data comprising: a device identifier of said mobile device, and previous transaction data; and determining, at said computer system, one or more buyer attributes for said customer from said user data associated with said virtual co-branded card.

3. The method of claim 1 wherein said customer notification comprises:

providing a location-relevant promotion.

4. The method of claim 1 wherein said customer notification comprises:

providing a location-relevant offer.

5. The method of claim 1 further comprising:

authorizing said virtual co-branded card to perform said mobile payment transaction at said time of qualification, wherein said time of qualification is not related to a proximity of said customer to a check-out register.

6. The method of claim 1 further comprising:

authorizing said virtual co-branded card to perform said mobile payment transaction at said time of qualification, wherein said performing of said mobile payment transaction is within a store but not at a check-out register.

7. The method of claim 1 wherein said determining of one or more buyer attributes further comprises:

determining attributes selected from said group consisting of: a name, a birthday, an address, an age, a number of children, and a time of a month when a highest number of purchases are made by said customer.

8. The method of claim 1 wherein said determining of one or more buyer attributes further comprises:

accessing a customer database containing data pertaining to purchase characteristics of at least a thousand other customers;

generating a plurality of customer purchasing patterns from said customer database;

comparing said collected user information with said plurality of customer purchasing patterns;

correlating said collected user information with at least one of said plurality of customer purchasing patterns; and assigning said at least one of said plurality of customer purchasing patterns that correlate with said collected user information as at least one buyer attribute of said one or more buyer attributes.

9. The method of claim 2 wherein said customer notification comprises:

providing a location-relevant promotion.

10. The method of claim 2 wherein said customer notification comprises:

providing a location-relevant offer.

11. The method of claim 2 further comprising:

authorizing said virtual co-branded card to perform said credit-based transaction at said time of qualification, wherein said time of qualification is not related to a proximity of said customer to a check-out register.

12. The method of claim 2 wherein said determining of one or more buyer attributes further comprises:

determining attributes selected from said group consisting of: a name, a birthday, an address, an age, a number of children, and a time of a month when a highest number of purchases are made by said customer.

13. The method of claim 2 wherein said determining of one or more buyer attributes further comprises:

accessing a customer database containing data pertaining to purchase characteristics of at least a thousand other customers;

generating a plurality of customer purchasing patterns from said customer database;

comparing said collected user data with said plurality of customer purchasing patterns;

correlating said collected user data with at least one of said plurality of customer purchasing patterns; and assigning said at least one of said plurality of customer purchasing patterns that correlate with said collected user data as at least one buyer attribute of said one or more buyer attributes.

14. The method of claim 1 wherein said user information further comprises:

a GPS location data for said mobile device obtained from a GPS of said mobile device; and a path taken by said user through a store prior to said transaction.

15. The method of claim 1 wherein said user information further comprises:
  a number of trips to said store prior to said transaction.

16. The method of claim 2 wherein said user data further comprises:
  a GPS location data for said mobile device obtained from a GPS of said mobile device; and
  a path taken by said user through a store prior to said transaction.

17. The method of claim 2 wherein said user data further comprises:
  a number of trips to said store prior to said transaction.

* * * * *